(12) United States Patent
Abrams et al.

(10) Patent No.: US 9,009,804 B2
(45) Date of Patent: Apr. 14, 2015

(54) METHOD AND SYSTEM FOR HYBRID SOFTWARE AS A SERVICE USER INTERFACES

(71) Applicant: CA, Inc., Islandia, NY (US)

(72) Inventors: Howard A. Abrams, San Mateo, CA (US); Stanislav Mitranic, Calgary (CA)

(73) Assignee: CA, Inc., New York, NY (US)

( * ) Notice: Subject to any disclaimer, the term of this patent is extended or adjusted under 35 U.S.C. 154(b) by 46 days.

(21) Appl. No.: 13/690,830

(22) Filed: Nov. 30, 2012

(65) Prior Publication Data

US 2014/0157380 A1 Jun. 5, 2014

(51) Int. Cl.
*H04L 9/32* (2006.01)
*H04L 29/06* (2006.01)
*G06F 17/21* (2006.01)
*G06F 21/31* (2013.01)

(52) U.S. Cl.
CPC ................ *H04L 67/42* (2013.01); *H04L 63/08* (2013.01); *H04L 9/32* (2013.01); *G06F 17/218* (2013.01); *H04L 9/3226* (2013.01); *H04L 63/083* (2013.01); *G06F 21/31* (2013.01)

(58) Field of Classification Search
CPC ....... H04L 67/42; H04L 63/08; H04L 63/083; H04L 9/3226; H04L 9/32; G06F 17/218; G06F 21/31
USPC ................ 726/4, 5, 7; 709/203; 715/234, 235
See application file for complete search history.

(56) References Cited

U.S. PATENT DOCUMENTS

| 7,183,183 | B2 | 2/2007 | Duerksen et al. |
| 7,299,039 | B2 | 11/2007 | Lee et al. |
| 7,783,604 | B1 | 8/2010 | Yueh |
| 8,178,861 | B2 | 5/2012 | Futatsuyama |
| 8,198,672 | B2 | 6/2012 | Alsmeier |
| 8,271,615 | B2 | 9/2012 | Ellison et al. |
| 2007/0094367 | A1* | 4/2007 | Esfahany et al. ............. 709/223 |
| 2010/0281107 | A1* | 11/2010 | Fallows et al. ................ 709/203 |
| 2011/0029702 | A1* | 2/2011 | Pirretti et al. ................. 710/100 |
| 2011/0277026 | A1 | 11/2011 | Agarwal et al. |
| 2012/0054625 | A1* | 3/2012 | Pugh et al. .................... 715/736 |

(Continued)

OTHER PUBLICATIONS

"Lockheed Martin Merges Cloud Agility with Premises Control to Meet Customer Needs," Windows Azure, Customer Solution Case Study, Jul. 2010, 6 pages.
Fishteyn, Daniil, "Deploying Software as a Service (SaaS)," WebApps, Inc. a.k.a. SaaS.com, Jan. 13, 2009, 11 pages.
Puttaswamy, Krishna, "Silverline: Toward Data Confidentiality in Storage-Intensive Cloud Applications," SOCC'11, Oct. 27-28, 2011, 13 pages.

*Primary Examiner* — Kambiz Zand
*Assistant Examiner* — Ayoub Alata
(74) *Attorney, Agent, or Firm* — Vierra Magen Marcus LLP

(57) ABSTRACT

A hybrid software as a service (SaaS) delivery model allows an enterprise to control sensitive data while application code and non-sensitive data are downloaded from a software provider. A client computing device of the enterprise downloads the application code, which determines an appearance and a behavior of a user interface of the application. The application code is also configured, such as with a network address of a database, to allow the client computing device to access the sensitive data which is hosted by the enterprise. The client computing device may download a file from the enterprise which accesses the application code. For example, an HTML file may access scripting code. Or, the client computing device downloads the application code directly from the software provider, in which case cross-origin resource sharing allows the client computing device to access the sensitive data hosted by the enterprise.

20 Claims, 4 Drawing Sheets

(56) References Cited

U.S. PATENT DOCUMENTS

| | | |
|---|---|---|
| 2012/0173760 A1 | 7/2012 | Jog et al. |
| 2012/0204169 A1 | 8/2012 | Breiter et al. |
| 2012/0204187 A1 | 8/2012 | Breiter et al. |
| 2013/0031462 A1* | 1/2013 | Calvo et al. .................. 715/234 |

* cited by examiner

METHOD AND SYSTEM FOR HYBRID SOFTWARE AS A SERVICE USER INTERFACES

BACKGROUND

Software as a service (SaaS), also referred to as on-demand software, is an example of a software delivery model in which software is centrally hosted on the cloud. Typically, an enterprise will enter into an agreement with a software provider in which the software provider provides hardware and software maintenance and support to allow the enterprise to focus on its core business model. In return, the enterprise pays a setup fee and a periodic subscription fee. The software provider hosts an application centrally so that software updates can be made without requiring the enterprise to install new software. SaaS has been used for many business applications, including accounting, customer relationship management, human resource management and service desk management. However, security concerns may prevent an enterprise from realizing the advantages of SaaS.

BRIEF SUMMARY

Techniques are provided which allows an enterprise to realize the benefits of the SaaS delivery model while maintaining control of sensitive data. A client computing device of an enterprise downloads application code which is provided and maintained by a software provider in accordance with a SaaS agreement between the enterprise and the software provider. The application code determines an appearance and a behavior of a user interface of the application. Moreover, the application code is configured to allow the client computing device to access the sensitive data which is hosted by the enterprise so that the enterprise maintains control of the data while enjoying the benefits of the SaaS delivery model. The client computing device executes the code to access the data hosted by the enterprise and to display the user interface with the data hosted by the enterprise. Data hosted by the service provider can also be integrated into the display.

DETAILED DESCRIPTION

Figure 1:
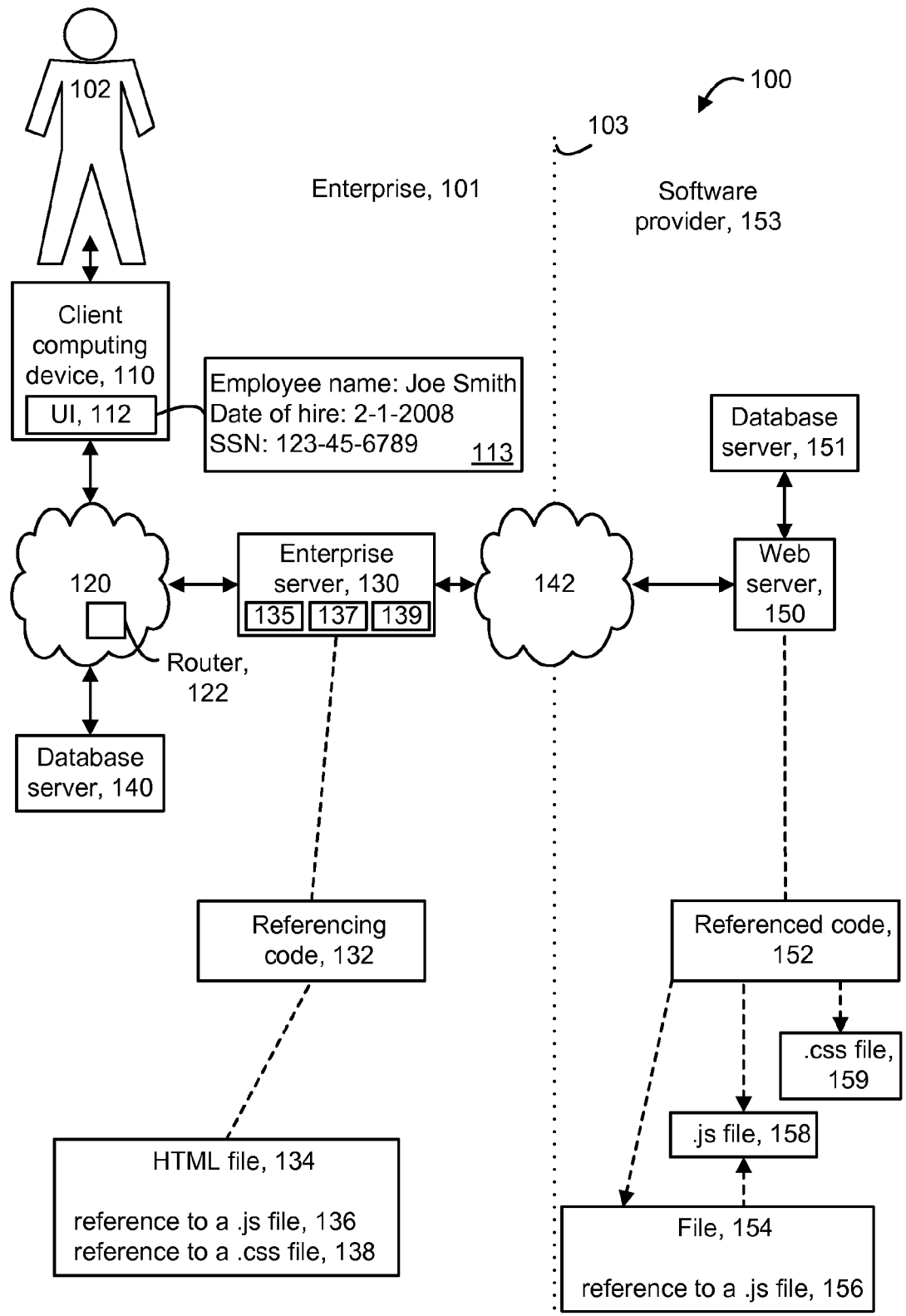
FIG. 1 depicts an example network 100 in which a user interface is provided by a software provider to an enterprise pursuant to a SaaS agreement.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or by combining software and hardware implementations that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

As mentioned at the outset, SaaS had become increasingly popular with enterprises such as in the business world. However, in applications involving sensitive data, customers are reluctant to send their data to the cloud, and even more reluctant to store it there. Examples of sensitive data include bank account information, social security numbers and passwords or other personal information. Another example is classified government information for which storage outside the country is restricted.

These customers may refuse to adopt the SaaS model and therefore not realize its benefits. A hybrid SaaS deployment can resolve this problem by running part of the application on the customer's premise, under the control of servers which are hosted by the enterprise, and part in the cloud, under the control of the software provider, and allowing some data to flow between the enterprise and the software provider. For example, application code which provides a user interface, and therefore, many of the application features, can be deployed as SaaS, while sensitive data which is used by the application remains completely on the customer's premises or otherwise under its control. This can be accomplished by providing a user interface (UI) that is written such that it is executed on the client premises, but delivered via the cloud on the fly, e.g., in real time as needed.

For example, the UI and UI logic can be written in a scripting language such as JavaScript and stored in one or more files. These files can be referenced by an HTML file which is served from a server of the enterprise. The files can be referenced directly, with the enterprise server communicating to a web server of the software provider. In another approach, the files can be referenced indirectly by statically referencing a dynamic file hosted by the web server. With these approaches, the software provider has complete dynamic control over all aspects of the UI because the software provider has written the UI code and can update it as desired. The UI logic, however, runs on the on-premise computing device such as in a browser and therefore has direct access to data in the enterprise. Or, instead of using on-premise HTML, in which case cross-origin resource sharing can be used to allow direct access from the browser page to on-premise data or services. In this case, an HTML file can be served from the web server. The techniques provided herein can be used generally with delivery of application code and are not limited to use with a web browser. For example, a UI can be provided without a web browser, where program code is downloaded from a host provider and runs locally and temporarily when the user provides a command.

A number of advantages are realized with the techniques provided herein. For example, a SaaS managed and hosted UI can be provided to customers who would otherwise be reluctant to use SaaS. These customers gain all the benefits that come with a SaaS UI, but without the enterprise data leaving their premises or otherwise leaving the control of the enterprise. These benefits include: (a) the ability to license features of the application as needed, on the fly, (b) roll out of new features to a subset of users or customers, (c) allow customers to try out new features on their own schedule, (d) provide rapid development of new features, (e) leverage cloud deployment (use of CDNs, etc.), (f) provide lower cost of management and hardware for customers (customers could have little or no hardware for UI; some hardware may be used for backend services), (g) provide lower cost of development for the software provider (manage same codebase with traditional SaaS deployments) and (h) customer data does not leave their premises or otherwise leave their control (data may leave premises such as when the client is a wireless device).

FIG. 1 depicts an example network 100 in which a user interface is provided by a software provider to an enterprise pursuant to a SaaS agreement. The network includes a network communication medium or cloud 142 representing, e.g., a wide area network such as the Internet or other network. A vertical dotted line 103 separates components of an enterprise 101 and components of a software provider 153. In the enterprise side of the network, an enterprise server 130 is connected at one side to the cloud 142 and at another side to a private network 120 of the enterprise. The private network could be a wide area network or a local area network, for instance, and includes an example router 122. A client computing device 110 operated by a user 102 and a database server 140 connect to the private network 120. The client computing device can provide a user interface (UI) 112, such as a display. An example display 113 of the UI depicts an employee name, date of hire and social security number (SSN), e.g., in a human resources application. The software provider side of the network includes a web server 150 and an associated database server 151.

The enterprise server 130 can include a computer program product, comprising a computer readable storage medium having computer readable program code embodied therewith. The computer readable program code comprises: computer readable program code 135 configured to receive a request from a client computing device of an enterprise for a file, the file comprises a reference to code, the file is hosted by a server hosted by an enterprise, computer readable program code 137 configured to transmit a request to a web server for the code using the reference and to receive the code from the web server pursuant to the request, the received code is configured to provide a user interface and to access data hosted by the enterprise, and computer readable program code 139 configured to provide the received code to the client computing device.

The web server 150 and database server 151 can be part of a system comprising: a storage device, and a processor in communication with the storage device, where the processor is programmed to: receive a request from a client computing device of an enterprise for code of an application, where the code of the application is configured to provide a user interface of the application and to access data hosted by the enterprise, and allow the client computing device to download the code of the application in accordance with a software as a service agreement between the enterprise and the software provider.

The web server 150 is hosted for the software provider. For example, the web server 150 can be hosted by the software provider itself, or by another entity on behalf of the software provider, such as by a content delivery network (CDN). A content delivery network is a large distributed system of servers deployed in multiple data centers in the Internet, to serve content to end-users with high availability and high performance.

In an example implementation, the UI provides a display or other output (e.g., printed, audio) based on data (e.g., sensitive data) hosted by the enterprise at the database server 140 and data (e.g., non-sensitive data) hosted by the software provider at the database server 151. For example, in the display 113, the employee name (Joe Smith) and date of hire (2-1-2008) can be from the database server 151. This data is considered to be non-sensitive and therefore can be stored outside the enterprise, at the database server 151. However, the SSN (123-45-6789) can be from the database server 140. This data is considered to be sensitive and therefore is stored within the enterprise, at the database server 140. Optionally, the sensitive data can be visually distinguished from the non-sensitive data in the UI such as by using a different font or color. Or, the display may provide the sensitive and non-sensitive data seamlessly so that the user of the application is not aware of the source of each item of data. The router 122 can route requests from the client computing device to the database server 140 or to the enterprise server 130 (acting as a gateway server) according to whether requested data is at the database server 140 or 151, respectively.

The client computing device can be a laptop, tablet, personal computer (PC), workstation, cell phones, other mobile phone, portable media player, personal digital assistant (PDA) or other computing device which is operated by an end user of the enterprise.

The enterprise can be any organization, such as a school, company or government organization. The components of the enterprise can be in one or more locations, such as office buildings, which are physically secured by the enterprise, or in different locations which are not physically secured by the enterprise. For example, the client computing device can be a mobile device outside an office of the enterprise.

The enterprise server can represent one or more servers. For example, the enterprise server can act as a gateway server, e.g., a network node that acts as an entrance to the enterprise network, and can serve data (e.g., web pages) to the client computing devices of the enterprise. The enterprise server can also act as a proxy server and a firewall server. A proxy server acts as an intermediary between a client computing device and the Internet so that the enterprise can provide security, administrative control, and caching services. A firewall server protects the enterprise network from outside intrusion. The enterprise server also could encompass the functions of the router 122 in controlling and routing traffic within the network 120.

In one approach, the client computing devices downloads referencing code 132 from the enterprise server, where the reference code references referenced code 152 (additional code). For example, the referencing code can include an HTML file 134 which is downloaded by the client computing device as a web page. The referencing code can be customized for a particular enterprise so that it references referenced code which is customized for the particular enterprise. As an example, the HTML file includes a reference to a JavaScript file 136 (a file having the .js extension) and a reference to a cascading style sheet file 138 (a file having the .css extension). JavaScript is an example of scripting code which can be embedded in an HTML file or provided by a separate file which is referenced from within an HTML file. Scripting code can be used to control the behavior of a user interface by adding interactivity. For example, certain actions can be performed by the code based on actions performed by the user. Example actions of the scripting code include accessing data and updating the display of a user interface based on the data. Example actions of the user include using a pointing device to interact with a widget (e.g., button, checkbox) of the user interface.

Regarding the cascading style sheet file, the appearance of a web page, such as its layout, and typographic and color-scheme information, can be provided by CSS instructions, which can either be embedded in the HTML file or provided by a separate file which is referenced from within an HTML file.

On the software provider side, the referenced code can include a .js file 158 which is referenced by the reference to a .js file 136, and a .css file 159 which is referenced by the reference to a .css file 138. The referenced code could also include a file 154 (e.g., an HTML file) which itself includes a reference to a .js file 156 (such as to the .js file 158). Many other variations are possible. Generally, the referenced code can include information for accessing the database server 140 of the enterprise, such as a network address of the database server 140. This could be a network address in an Internet Protocol (IP) address space, for instance, such as a Uniform Resource Locator (URL). An example syntax of a URL is: scheme://domain:port/path?query_string#fragment_id. The scheme name (e.g., http, https, ftp) defines the namespace, purpose, and the syntax of the remaining part of the URL. The domain name or IP address gives the destination location for the URL. The port number is optional. If omitted, the default for the scheme is used (e.g., port 80 for http and port 443 for https). The path can be a folder or file path used to specify or find a requested resource. The query string contains data to be passed to software running on a server such as a database server. It may contain name/value pairs separated by ampersands, for example, a query involving an employee name is: ?first_name=Joe&last_name=Smith.

For instance, the domain name of the enterprise can be www.enterprise.com. A folder "database" can represent the database server 140. Further, a file "SSN" can represent the SSNs of the employees in the database. An example query to the database which provides the employee name as an input and returns the SSN as an output is: http://www.enterprise.com/database/

SSN?first_name=Joe&last_name=Smith. The network address of the database is www.enterprise.com/database and the network address of the SSN folder of the database is www.enterprise.com/database/SSN. Moreover, as mentioned, data from the enterprise and the software provider can be provided concurrently in the same UI. Data from the software provider can be accessed similarly. For example, an example query to a database of the software provider which provides the employee name as an input and returns the date of hire as an output is: http://www.softwareprovider.com/enterprise/database/DateOfHire?first_name=Joe & last_name=Smith. The network address of the database is www.softwareprovider.com/enterprise/database and the network address of the DateOfHire folder of the database is www.softwareprovider.com/enterprise/database/DateOfHire.

In an example implementation, the user opens a hybrid-SaaS web application using a web browser program at the client computing device. This browser is running within the enterprise network and connects to the Internet based SaaS service. The user then authenticates with the application and the user's identity is shared with the enterprise. The browser downloads html, css, and JavaScript code to run within the browser. This code could be from the SaaS host or a content delivery network. The SaaS application has control over what assets (JavaScript, etc.) get downloaded based on the user's identity. The JavaScript code accesses data available from services running within the customer premises, using the authenticated credentials. The user interacts with the enterprise data using the UI. Sensitive data does not leave the local enterprise network and is not stored by the SaaS application or in the browser. Advantageously, the sensitive data remains in the local services running in the enterprise. The client computing device uses the code of the application to access the sensitive data without allowing access to the data by the software provider. Further example implementation details are provided in connection with FIG. 3A to 3F.

Figure 2:
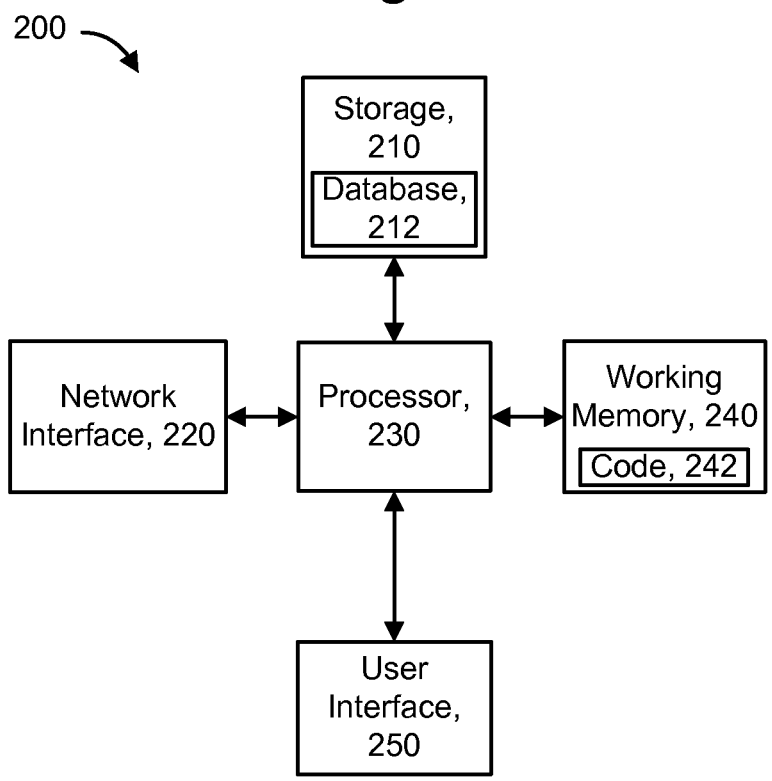
FIG. 2 depicts an example computing device of the network of FIG. 1.

FIG. 2 depicts an example computing device of the network of FIG. 1. The computing device 200 is a simplified representation of a system which can represent any of the client computing device, router or any of the servers of FIG. 1, for instance. The computing device 200 includes a storage device 210, a network interface 220 for communicating with other computing devices, a processor 230 for executing code (e.g., software instructions/modules), a working memory 240 such as RAM for storing the code 242 after it is loaded from the storage device 210, for instance, and a user interface 250. The storage device 210 or working memory 240 may be considered to be a tangible, non-transitory processor- or computer-readable storage device or apparatus having processor readable code embodied thereon for programming the processor 230 to perform methods for providing the functionality discussed herein.

A database 212 can be provided in the storage device 210 such as to represent the database server 140 or 151 of FIG. 1. The user interface 250 can include a display to provide information to a human user, and an input device such as a keyboard, mouse or other pointing device, or voice command module, for receiving inputs/commands from a human user.

Figure 3A:
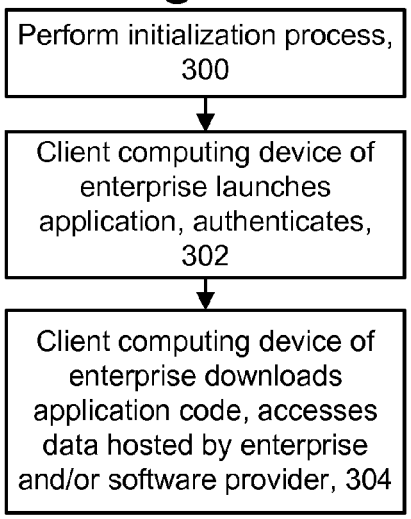
FIG. 3A depicts an example process for providing a user interface at an enterprise using software from a software provider in accordance with the network of FIG. 1.

FIG. 3A depicts an example process for providing a user interface at an enterprise using software from a software provider in accordance with the network of FIG. 1. Step 300 performs an initialization process, discussed further in connection with FIG. 3B. At step 302, the client computing device of the enterprise launches the application and authenticates the user to the application, as discussed further in connection with FIG. 3C. At step 304, the client computing device of the enterprise downloads application code, and accesses data hosted by the enterprise and/or software provider, as discussed further in connection with FIG. 3D to 3F.

Figure 3B:
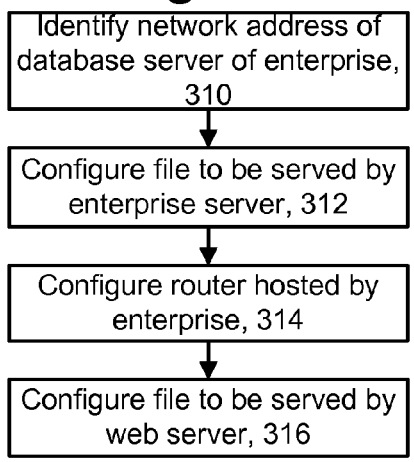
FIG. 3B depicts an example process for performing an initialization process in accordance with step 300 of FIG. 3A.

FIG. 3B depicts an example process for performing an initialization process in accordance with step 300 of FIG. 3A. In the initialization process, workers of the software provider can meet with workers of the enterprise to determine the needs of the enterprise and to identify the computing resources of the enterprise. The software provider can then develop an application which meets these needs and make this application available using the SaaS delivery model. Some configuration of the computing devices of the enterprise can also be done. For example, step 310 includes identifying a network address of a database server in the enterprise which will be accessed by the application. An example is the database server 140 of the enterprise (FIG. 1). Network addresses of additional database servers outside the enterprise can also be identified. An example is the database server 151 of the enterprise (FIG. 1). The network addresses can be URLs, for instance, as discussed in connection with FIG. 1.

Step 312 includes configuring a file to be served by the enterprise server. For example, this can be an HTML file such as the HTML file 134 discussed in connection with FIG. 1. This can be a relatively small file which references the bulk of the application logic which is handled by code at the web server 150 of the software provider. By accessing the application through a file served by a server in the same domain as the database server 140, the client computing device can subsequently access data from the database server 140 without using cross-origin resource sharing, discussed further in connection with FIG. 3E. Step 314 includes optionally configuring a router hosted by the enterprise, such as the router 122 in FIG. 1, as discussed further in connection with FIG. 3F. Step 316 includes configuring a file to be served by the web server, as discussed further in connection with FIG. 3D. When accessing the application through a file served by a server in a different domain than the database server 140, the client computing device can subsequently access data from the database server 140 using cross-origin resource sharing, discussed further in connection with FIG. 3E.

Figure 3C:
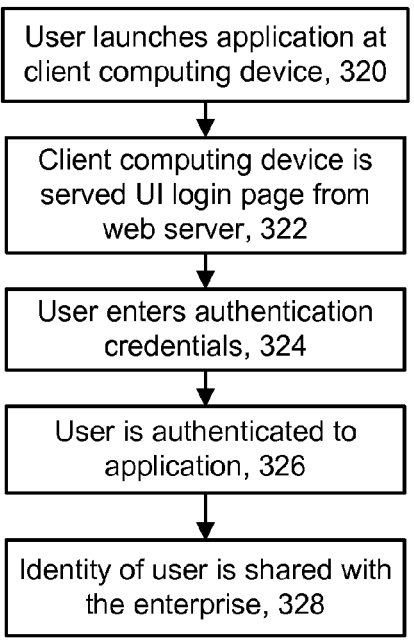
FIG. 3C depicts an example process for a client computing device launching an application and authenticating in accordance with step 302 of FIG. 3A.

FIG. 3C depicts an example process for a client computing device launching an application and authenticating in accordance with step 302 of FIG. 3A. At step 320, the user launches the application at the client computing device. For example, a web browser can be used. At step 322, the client computing device is served a UI login page from the web server. At step 324, the user enters authentication credentials such as a login name and a password. At step 326, the user is authenticated to the application, assuming the authentication credentials are valid. At step 328, the identity of the user is shared with the enterprise. For example, this sharing can allow the enterprise to set restrictions on data which can be accessed by the particular user. The application could also tailor the application features and settings to the particular user. In one approach, the enterprise server stores the user's identity while a session is maintained with the web server. Alternatively, the enterprise authenticates the user and the identity is shared with the software provider.

Figure 3D:
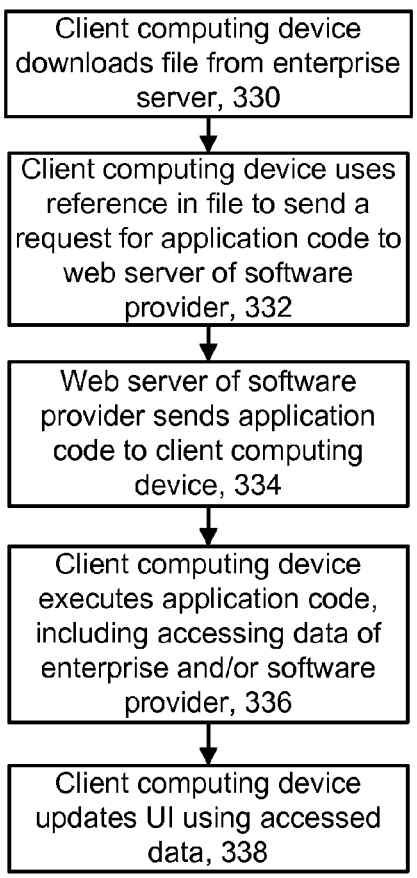
FIG. 3D depicts an example process for a client computing device downloading application code and accessing data in accordance with step 304 of FIG. 3A, where the client computing device downloads a file from the enterprise server.

FIG. 3D depicts an example process for a client computing device downloading application code and accessing data in accordance with step 304 of FIG. 3A, where the client computing device downloads a file from the enterprise server. In this approach, the client computing device downloads a file from the enterprise server (step 330), where the file includes a reference to application code which is hosted by the web server. The client computing device uses the reference in the file to send a request for application code to the web server of the software provider (step 332). At step 334, the web server of the software provider sends the application code to the client computing device. Communications between the client computing device and the web server pass through the enterprise server (as a gateway server). The application can include information such as a network address for accessing database hosted by the enterprise and/or a network address for accessing database hosted by the software provider. The application code for accessing the data is therefore downloaded indirectly from the software provider. At step 336, the client computing device executes the application code, including accessing data of the enterprise and/or the software provider. At step 338, the client computing device updates the UI using the accessed data. See example display 113 of the UI in FIG. 1.

Generally, the client computing device can request access to data to update the UI, e.g., in response to user inputs, when initially running the application, periodically and/or as updated data is pushed to the application from the web server.

Figure 3E:
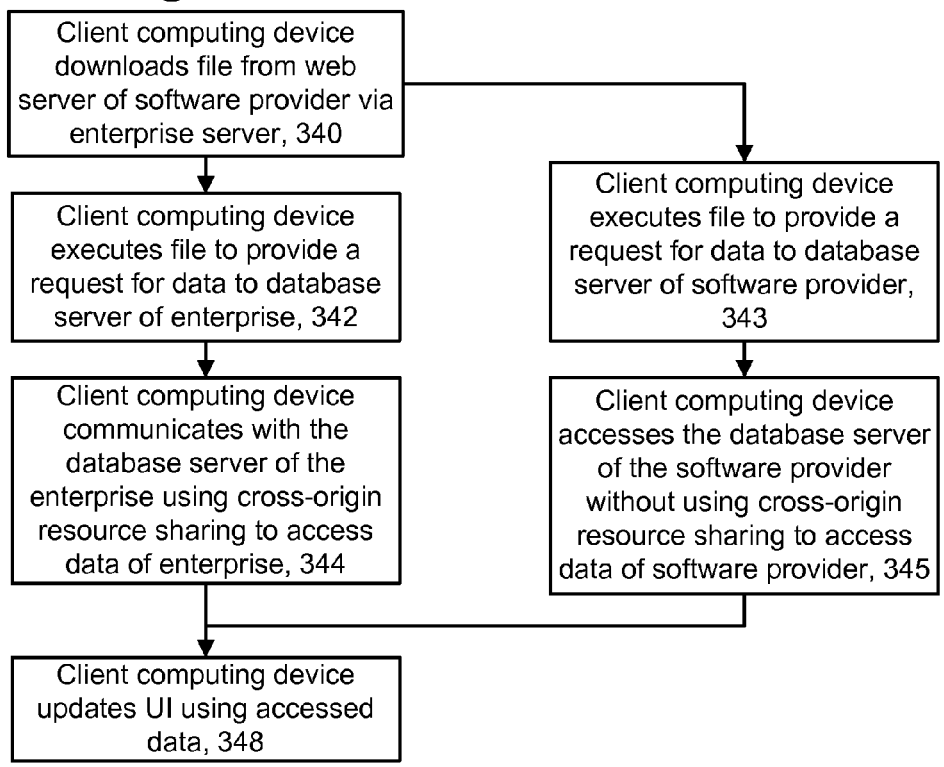
FIG. 3E depicts an example process for a client computing device downloading application code and accessing data in accordance with step 304 of FIG. 3A, where the client computing device downloads a file from the web server of the software provider.

FIG. 3E depicts an example process for a client computing device downloading application code and accessing data in accordance with step 304 of FIG. 3A, where the client computing device downloads a file from the web server of the software provider. In this approach, the client computing device directly downloads a file from the web server of the software provider, where the file includes code for accessing data at the enterprise. The client computing device may access the data using cross-origin resource sharing to overcome the fact that the database hosted by the enterprise is in a different domain than the web server.

At step 340, the client computing device downloads a file from the web server of the software provider via the enterprise server (e.g., acting as a gateway server). The file includes the application code, including code for accessing data of the enterprise and/or the software provider. At step 342, the client computing device executes the file to provide a request for data to a database server of the enterprise. At step 344, the client computing device communicates with the database server of the enterprise using cross-origin resource sharing to access the data of the enterprise. This can include providing a request from the client computing device to the database server using the HTTP "Origin" header and receiving a response using the HTTP "Access-Control-Allow-Origin" header, as discussed further below.

Optionally, steps 343 and 345 can also be performed concurrently to access the data of the software provider. At step 343, the client computing device executes the file to provide a request for data to a database server of the software provider. At step 345, the client computing device accesses the database server of the software provider without using cross-origin resource sharing to access the data of the software provider. Cross-origin resource sharing is not used when the database server 151 and the web server 150 are in a same domain. At step 348, the client computing device updates the UI using the accessed data.

Cross-origin resource sharing is used to overcome a security feature referred to as a same origin policy which is used in many browser-side programming languages, such as JavaScript. Cross-origin resource sharing allows the client computing device to access the data hosted by the enterprise using code downloaded from a domain of the web server even though the data hosted by the enterprise is in a different domain than the domain of the web server. Generally, the origin can include a domain, an application layer protocol (e.g., http vs. https) and a port number. As a simplification, the application layer protocol and the port number are assumed to be the same for the enterprise and the software provider.

The same origin policy permits a script running on a web page which originates from a given web site, e.g., a given domain, to access data from within the domain with no specific restrictions. Thus, script at the web server 150 can access the database server 151 with no specific restrictions. However, the policy prevents script running on a web page which originates from a first domain, such as the domain of the software provider, to access data from within another domain, such as the domain of the enterprise, unless an exception is made by the entity from which access is sought. The policy prevents an unauthorized web site from accessing a client computing device.

With cross-origin resource sharing, a resource such as the database server 140 in the domain www.enterprise.com is configured to identify one or more other domains which are authorized to access it. As discussed in a prior example involving database addresses, assume www.softwareprovider.com is the domain of the web server of the software provider. Further, the software provider may maintain a domain name which is specific to a particular enterprise, e.g., www.softwareprovider.com/enterprise. The database server 140 can thus be configured to provide a response to a request from a web page which originated from www.softwareprovider.com/enterprise, where the response includes a special header followed by the requested data. For example, the request can invoke the XMLHttpRequest API which is available in web browser scripting languages such as JavaScript. This API is used to send http or https requests directly to a server and load the data provided in response directly back into the script.

For instance, the client computing device can send a request to obtain the SSN of an employee using the employee's name. The request includes a header of: "Origin: http://www.softwareprovider.com/enterprise" and is sent to the address of: "http://www.enterprise.com/database/SSN?first_name=Joe&last_name=Smith." The database server 140 returns a response with the header "Access-Control-Allow-Origin: http://www.softwareprovider.com/enterprise" followed by the requested SSN, which is "123-45-6789." One or more domains which are allowed to access the database server 140 can be identified in the header. The client computing device verifies that the domain in the header is the same as the domain of the web page in the request (e.g., www.softwareprovider.com/enterprise). GET and POST cross-site requests can be made, for instance. A GET request can be used to retrieve data from a database while a POST request can be used to write data to a database.

Figure 3F:
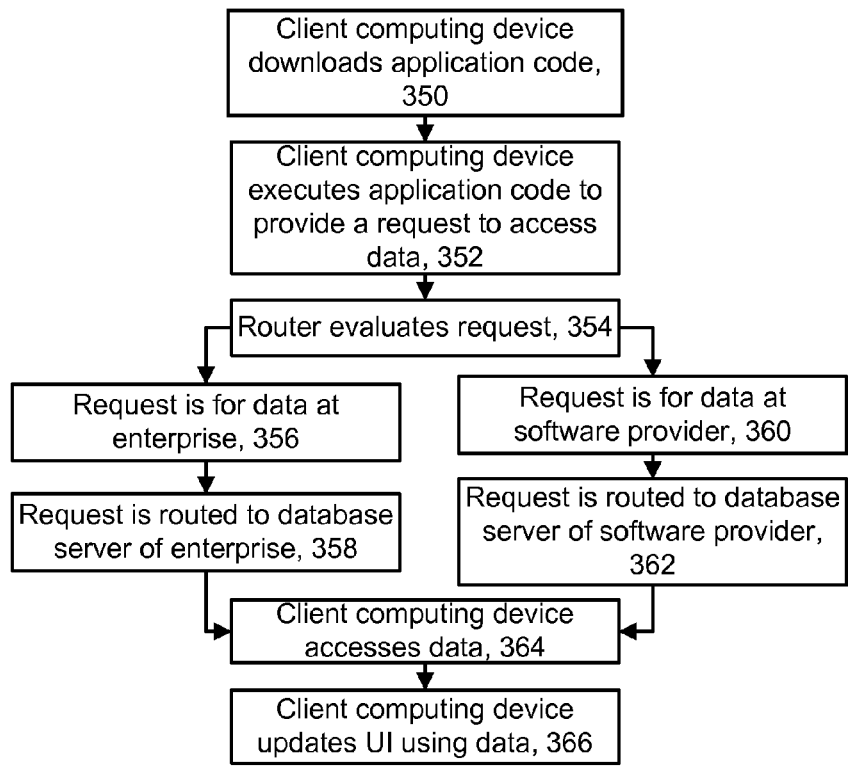
FIG. 3F depicts an example process for a client computing device downloading application code and accessing data in accordance with step 304 of FIG. 3A, where a router at the enterprise decides to route a request for data to a database of the enterprise or the software provider.

FIG. 3F depicts an example process for a client computing device downloading application code and accessing data in accordance with step 304 of FIG. 3A, where a router at the enterprise decides to route a request for data to a database of the enterprise or the software provider. The router 122 of FIG. 1 is an example router which can be configured to determine where to route a request for data from the client computing device.

At step 350, the client computing device downloads application code, e.g., from a web server. At step 352, the client computing device executes the application code to provide a request to access data. At step 354, the router receives the request and evaluates it, such as by reading a network address/URL of a resource from which data is requested. At step 356, the router determines that the request is for data at the enterprise, e.g., the data is at a database server hosted by the enterprise and in a domain of the enterprise. At step 358, in response to this determination, the router routes the request to the corresponding database server of the enterprise.

Alternatively, at step 360, the router determines that the request is for data at the software provider, e.g., the data is at a database server hosted for the software provider and in a domain of the software provider or in a federated domain, such as a domain of an associated content delivery network. For example, the router may store a list of one or more network addresses associated with the enterprise, and compare a network address in the request to the list to make the determination. If the network address is on the list, the request is routed within the enterprise. If the network address is not on the list, the request is routed to the software provider, outside the enterprise. At step 362, in response to this determination, the router routes the request to the corresponding database server for the software provider. At step 364, the client computing device access the data, receiving a response to the request provided at step 352. At step 366, the client computing device updates the UI using the data.

The client computing device can therefore use the code of the application to transmit a request for data hosted by the enterprise, where the request is evaluated by a router hosted by the enterprise, and the router determines that the data is stored at a database hosted by the enterprise and routes the request to the database. Further, the client computing device uses the code of the application to transmit an additional request, where the additional request is for data hosted by the software provider, the additional request is evaluated by the router which determines that the data hosted by the software provider is hosted by the software provider and, in response, routes the request to the software provider.

The functionality described herein may be implemented using hardware, software or a combination of both hardware and software. For software, one or more non-transitory, tangible processor readable storage devices or apparatuses having processor readable code embodied thereon for programming one or more processors may be used. The non-transitory, tangible processor readable storage devices can include computer readable media such as volatile and non-volatile media, removable and non-removable media.

The flowchart and block diagrams in the figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method for delivering software to an enterprise, comprising:

using a client computing device of the enterprise, downloading an HTML file which comprises a reference to code of an application, the code of the application is configured to provide a user interface of the application and to access data hosted by the enterprise and data hosted by a software provider outside the enterprise, the code of the application and the data hosted by the software provider are in a domain of the software provider, and the data hosted by the enterprise is in a domain of the enterprise which is different than the domain of the software provider;

sending a request for the code of the application to a web server of the software provider, the request comprises the reference, and downloading the code of the application from the web server pursuant to the request and in accordance with a software as a service agreement between the enterprise and the software provider; and executing the code of the application at the client computing device, the executing the code of the application comprises accessing the data hosted by the enterprise using cross-origin resource sharing, accessing the data hosted by the software provider without using the cross-origin resource sharing, and updating the user interface to concurrently display the data hosted by the enterprise and the data hosted by the software provider, wherein:

the accessing the data hosted by the enterprise using the cross-origin resource sharing comprises providing a first query to a database server of the enterprise, the first query comprises a network address in the domain of the enterprise of the database server of the enterprise, a header identifying a domain name of the domain of the software provider, a name of a file which stores a first type of data of a plurality of people, and an identifier of a person of the plurality of people, and receiving a response from the database server of the enterprise;

the accessing the data hosted by the software provider without using the cross-origin resource sharing comprises providing a second query to a database server of the software provider, the second query comprises a network address in the domain of the software provider of the database server of the software provider, a name of a file which stores a second type of data of the plurality of people, and the identifier of the person, and receiving a response from the database server of the software provider; and the enterprise maintains control of the first type of data and prevents the software provider from accessing the first type of data by storing the first type of data at the database server of the enterprise.

2. The method of claim 1, wherein:
the code of the application comprises script code;
the reference is to the script code;
the HTML file is hosted by a server of the enterprise and is downloaded by the client computing device from the server of the enterprise;
the script code is hosted by the web server of the software provider; and
the client computing device downloads the script code from the web server of the software provider using the reference to the script code.

3. The method of claim 2, wherein:
the code of the application comprises cascading style sheet code;
the reference is to the cascading style sheet code;
the cascading style sheet code is hosted by the web server of the software provider; and
the client computing device downloads the cascading style sheet code from the web server of the software provider using the reference to the cascading style sheet code.

4. The method of claim 1, wherein:
the code of the application comprises additional code;
the reference is to a dynamic file;
the additional code is accessed via the dynamic file;
the HTML file is hosted by a server of the enterprise and is downloaded by the client computing device from the server of the enterprise;
the dynamic file and the additional code are hosted by the web server of the software provider; and
the client computing device downloads the additional code from the web server of the software provider using the reference to the dynamic file.

5. The method of claim 1, wherein:
the code of the application comprises script code;
the reference is to the script code;
the HTML file and the script code are hosted by the web server of the software provider; and
the client computing device downloads the HTML file and the script code from the web server of the software provider.

6. The method of claim 5, wherein:
the script code comprises instructions for the accessing the data hosted by the enterprise using the cross-origin resource sharing.

7. The method of claim 1, further comprising:
using the client computing device, receiving authentication credentials which are entered by a user; and
providing the authentication credentials to the software provider, the downloading of the code of the application is responsive to the user being authenticated to the software provider, and the code of the application uses the authentication credentials to authenticate the user to the enterprise in connection with the accessing of the data hosted by the enterprise without the user re-entering the authentication credentials.

8. The method of claim 1, wherein:
the code of the application comprises the network address of the database server of the enterprise; and
the client computing device downloads the network address of the database server of the enterprise from the web server of the software provider.

9. The method of claim 1, wherein:
the client computing device uses the code of the application to transmit the first query, the first query is evaluated by a router hosted by the enterprise, the router determines that the first type of data is stored at the database server of the enterprise and routes the request to the database server of the enterprise; and
the client computing device uses the code of the application to transmit the second query, the second query is evaluated by the router which determines that the second type of data is stored at the database server of the software provider and, in response, routes the request for the data hosted by the software provider to the database server of the software provider.

10. A system, comprising:
a storage device; and
a processor in communication with the storage device, the processor programmed to:
receive a request from a client computing device of an enterprise for code of an application, the code of the application is configured to provide a user interface of the application and to access a first type of data hosted by the enterprise and a second type of data hosted by a software provider; and
allow the client computing device to download the code of the application in accordance with a software as a service agreement between the enterprise and the software provider, the code of the application comprises:
code which identifies a network address in a domain of the enterprise of a database server of the enterprise, a domain name of a domain of the software provider, and a name of a file which stores a first type of data of a plurality of people;
code for providing a first query to the database server of the enterprise using the network address in the domain of the enterprise, the domain name of the domain of the software provider, the name of the file which stores the first type of data, and an identifier of a person of the plurality of people, to obtain the first type of data for the person;
code which identifies a network address in the domain of the software provider of a database server of the software provider, and a name of a file which stores a second type of data of the plurality of people;
code for providing a second query to the database server of the software provider using the network address in the domain of the software provider, the name of the file which stores the second type of data and the identifier of the person, to obtain the second type of data for the person; and
code for concurrently displaying the first type of data for the person and the second type of data for the person and for visually identifying the first type of data for as being sensitive to the enterprise while visually identifying the second type of data for the software provider as being non-sensitive to the enterprise.

11. The system of claim 10, wherein:
the request comprises a request for an HTML file in a domain of the system; and
the code of the application comprises instructions which allow the client computing device to access the data hosted by the enterprise using cross-origin resource sharing, the cross-origin resource sharing allows the client computing device to access the data hosted by the enterprise even though the data hosted by the enterprise is in a different domain than the domain of the system.

12. The system of claim 10, wherein:
the code of the application comprises script code hosted by the system; and
the request is based on a reference to the script code in an HTML file which is loaded by the client computing device from a server of the enterprise.

13. The system of claim 10, wherein:
the code of the application comprises a file hosted by the system, the file is dynamically updateable by the software provider; and
the request is based on a reference to the file in a file which is loaded by the client computing device from a server of the enterprise.

14. The system of claim 10, wherein:
the code of the application is configured with the network address in the domain of the enterprise of the database server of the enterprise in an initialization process before the request is received.

15. A computer program product, comprising:
a computer readable memory having computer readable program code embodied therewith, the computer readable program code comprising:
  computer readable program code configured to receive a request from a client computing device of an enterprise for a file, the file comprises a reference to code, the file is hosted by a server hosted by an enterprise,
  computer readable program code configured to transmit a request to a web server of a software provider for the code using the reference and to receive the code from the web server pursuant to the request as received code, the received code is configured to provide a user interface which accesses data hosted by the enterprise using cross-origin resource sharing and data hosted by the software provider without using cross-origin resource sharing and concurrently displays the data hosted by the enterprise and the data hosted by the software provider on a user interface, wherein the data hosted by the enterprise is not accessible to the software provider; and
  computer readable program code configured to provide the received code to the client computing device.

16. The computer program product of claim 15, wherein:
the file comprises an HTML file;
the received code comprise script code; and
the reference is to the script code.

17. The computer program product of claim 15, wherein:
the data is stored in a database of the enterprise; and
the received code comprises a network address of the database.

18. The method of claim 1, wherein:
in the user interface, the data hosted by the enterprise is visually distinguished from the data hosted by the software provider.

19. The method of claim 1, wherein:
the first type of data comprises at least one of bank account information, a social security number or a password of the person.

20. The method of claim 1, wherein:
the first type of data comprises personal information of the person in a human resources application.

* * * * *